United States Patent
Li

(10) Patent No.: US 10,451,931 B2
(45) Date of Patent: Oct. 22, 2019

(54) TRANSFLECTIVE DISPLAY PANEL AND TRANSFLECTIVE DISPLAY DEVICE

(71) Applicant: BOE TECHNOLOGY GROUP CO., LTD., Beijing (CN)

(72) Inventor: Yingyi Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 84 days.

(21) Appl. No.: 15/507,531

(22) PCT Filed: Mar. 24, 2016

(86) PCT No.: PCT/CN2016/077224
§ 371 (c)(1),
(2) Date: Feb. 28, 2017

(87) PCT Pub. No.: WO2017/049888
PCT Pub. Date: Mar. 30, 2017

(65) Prior Publication Data
US 2018/0180953 A1  Jun. 28, 2018

(30) Foreign Application Priority Data
Sep. 22, 2015  (CN) .......................... 2015 1 0609220

(51) Int. Cl.
*G02F 1/1335* (2006.01)
*G02F 1/1343* (2006.01)
(Continued)

(52) U.S. Cl.
CPC ........ *G02F 1/134363* (2013.01); *G02F 1/137* (2013.01); *G02F 1/13363* (2013.01);
(Continued)

(58) Field of Classification Search
CPC ......... G02F 1/133555; G02F 1/134363; G02F 2001/134372
See application file for complete search history.

(56) References Cited

U.S. PATENT DOCUMENTS

2014/0016052 A1    1/2014 Yang et al.
2016/0054621 A1*   2/2016 Xie .................. G02F 1/133555
                                                    349/43
2017/0123269 A1*   5/2017 Tang ................. G02F 1/133555

FOREIGN PATENT DOCUMENTS

CN         1655021 A        8/2005
CN       101813842 A        8/2010
(Continued)

OTHER PUBLICATIONS

Translation of CN102650778 Sep. 2018.*
Chinese Office Action dated Jul. 28, 2017.
Second Chinese Office Action dated Apr. 10, 2018.
International Search Report of the PCT/CN2016/077224 dated Jul. 7, 2016.

*Primary Examiner* — Phu Vu
(74) *Attorney, Agent, or Firm* — Dilworth & Barrese, LLP; Michael J. Musella, Esq.

(57) ABSTRACT

A transflective display panel and a transflective display device. The transflective display panel includes: a first substrate and a second substrate disposed opposite to each other, and blue phase liquid crystal disposed between the first substrate and the second substrate. The first substrate includes a first base substrate and pixel electrodes and common electrodes that are disposed on a side of the first base substrate that faces the second substrate, the pixel electrodes serve as reflecting electrodes or both the pixel electrodes and the common electrodes serve as reflecting electrodes. The second substrate comprises a second base substrate.

18 Claims, 5 Drawing Sheets

(51) Int. Cl.
   *G02F 1/137* (2006.01)
   *G02F 1/13363* (2006.01)
   *G02F 1/13357* (2006.01)
   *G02F 1/1333* (2006.01)

(52) U.S. Cl.
   CPC .... *G02F 1/13439* (2013.01); *G02F 1/133528* (2013.01); *G02F 1/133553* (2013.01); *G02F 1/133555* (2013.01); *G02F 1/1336* (2013.01); *G02F 2001/13793* (2013.01); *G02F 2001/133342* (2013.01); *G02F 2001/133531* (2013.01); *G02F 2001/133565* (2013.01); *G02F 2001/133618* (2013.01); *G02F 2001/133638* (2013.01); *G02F 2001/134372* (2013.01); *G02F 2201/121* (2013.01); *G02F 2201/123* (2013.01); *G02F 2413/02* (2013.01); *G02F 2413/05* (2013.01); *G02F 2413/08* (2013.01)

(56) References Cited

FOREIGN PATENT DOCUMENTS

| | | |
|---|---|---|
| CN | 102650778 A | 8/2012 |
| CN | 102789101 A | 11/2012 |
| CN | 202693962 U | 1/2013 |
| CN | 103941454 A | 7/2014 |
| CN | 103969899 A | 8/2014 |
| CN | 105093665 A | 11/2015 |
| CN | 204945560 U | 1/2016 |
| JP | 2009036800 A | 2/2009 |
| KR | 20080067041 A | 7/2008 |

* cited by examiner

TRANSFLECTIVE DISPLAY PANEL AND TRANSFLECTIVE DISPLAY DEVICE

TECHNICAL FIELD

The present disclosure relates to the field of display technology, particularly to a transflective display panel and a transflective display device.

BACKGROUND

Liquid crystal display devices (LCDs) have been widely applied due to their advantages such as low power consumption and good display effect. A liquid crystal display device includes an array substrate and a color filter substrate arranged opposite to each other with liquid crystal disposed therebetween.

Since liquid crystal does not emit light by itself, a light source is required in a liquid crystal display device to display images. Depending on the type of the light source adopted, liquid crystal display devices may be classified into transmission type liquid crystal display devices, reflection type liquid crystal display devices, and transflecting type liquid crystal display devices.

Transflecting type liquid crystal devices have advantages of both transmission type liquid crystal display devices and reflection type liquid crystal display devices. However, transflecting type liquid crystal devices in the state of art have complex structures and manufacturing process.

SUMMARY

The present disclosure provides a transflective display panel and a transflective display device for reducing the complexity of structure and manufacturing process.

In accordance with one aspect of the present disclosure, there is provided a transflective display panel including: a first substrate and a second substrate disposed opposite to each other, and blue phase liquid crystal disposed between the first substrate and the second substrate. The first substrate includes a first base substrate and pixel electrodes and common electrodes that are disposed on a side of the first base substrate that faces the second substrate. The pixel electrodes serve as reflecting electrodes or both the pixel electrodes and the common electrodes serve as reflecting electrodes. The second substrate includes a second base substrate.

According to an embodiment of the present disclosure, a first quarter wave plate and a first polarizer may be disposed in order on a side of the first base substrate that is away from the second substrate, and a second quarter wave plate and a second polarizer may be disposed in order on a side of the second base substrate that is away from the first substrate.

According to an embodiment of the present disclosure, a direction of an optical axis of the first quarter wave plate and a direction of an optical axis of the second quarter wave plate may be perpendicular to each other.

According to an embodiment of the present disclosure, a direction of a transmission axis of the first polarizer may be the same as a direction of a transmission axis of the second polarizer.

According to an embodiment of the present disclosure, a direction of an optical axis of the first quarter wave plate may form an angle of 45 degree with a direction of a transmission axis of the first polarizer.

According to an embodiment of the present disclosure, a direction of an optical axis of the second quarter wave plate may form an angle of 45 degree with a direction of a transmission axis of the second polarizer.

According to an embodiment of the present disclosure, both the pixel electrodes and the common electrodes serve as reflecting electrodes, and the pixel electrodes and the common electrodes are disposed alternatively on a side of the first base substrate that faces the second substrate.

According to an embodiment of the present disclosure, the pixel electrodes serve as reflecting electrodes, and the first substrate may further include an insulating layer, the common electrodes are disposed between the first base substrate and the insulating layer, and the insulating layer is disposed between the common electrodes and the pixel electrodes.

According to an embodiment of the present disclosure, bump structures may be disposed on a side of the reflecting electrode that is away from the blue phase liquid crystal.

According to an embodiment of the present disclosure, a strength of transverse electric field in reflection regions formed with the reflecting electrodes of the transflective display panel may be smaller than that in transmission regions not formed with the reflecting electrodes of the transflective display panel.

In accordance with another aspect of the present disclosure, there is provided a transflective display device including the transflective display panel according to the present disclosure and a backlight module located on a side of the first substrate that is away from the second substrate.

The transflective display panel and the transflective display device provided in the present disclosure needs not to be provided with an alignment film, thereby reducing the complexity of the structure and the manufacturing process.

BRIEF DESCRIPTION OF DRAWINGS

In order to explain the technical proposal of embodiments of the present disclosure more clearly, embodiments of the present disclosure will be described in detail below with reference to accompanying drawings. It should be appreciated that the following description is only for explaining embodiments of the present disclosure rather than limiting the scope of the present disclosure. For those skilled in the art, various modifications and variations may be made to the embodiments without departing from the scope of the present disclosure. In the illustrated accompanying drawings.

DETAILED DESCRIPTION

In order for those skilled in the art to better understand the technical proposal of the present disclosure, the transflective display panel and the transflective display device provided in the present disclosure will be described in detail below with reference to accompanying drawings.

Figure 1:
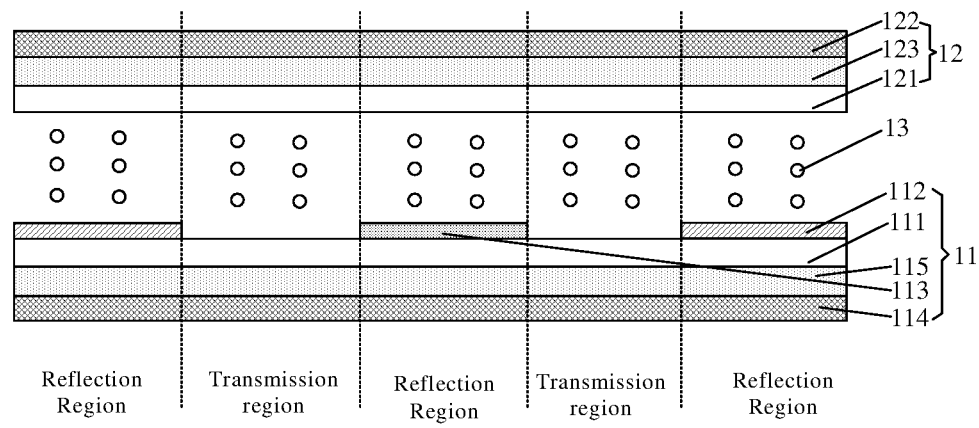
FIG. 1 is a structure diagram of a transflective display panel according to an embodiment of the present disclosure.

FIG. 1 is a structure diagram of a transflective display panel according to an embodiment of the present disclosure.

As illustrated in FIG. 1, the transflective display panel may be divided into reflection regions formed with reflecting electrodes and transmission regions not formed with reflecting electrodes. The transflective display panel may include a first substrate 11 and a second substrate 12 disposed opposite to each other and blue phase liquid crystal 13 disposed between the first substrate 11 and the second substrate 12. The first substrate 11 may include a first base substrate 111 as well as pixel electrodes 112 and common electrodes 113 that are disposed on the first base substrate 111. Pixel electrodes 112 and common electrodes 113 are disposed on a side of the first base substrate 111, which side faces the second substrate 12. The second substrate 12 may include a second base substrate 121. According to the present embodiment, both the pixel electrodes 112 and the common electrodes 113 may be configured as reflecting electrodes.

Blue phase liquid crystal 13 has an advantage of isotropy in macroscopy scale in case of no driving voltage and an advantage of fast response.

According to an embodiment of the present disclosure, reflecting electrodes may be made of an opaque metal. For example, reflecting electrodes may be made of the opaque metal with high reflectivity.

Figure 2:
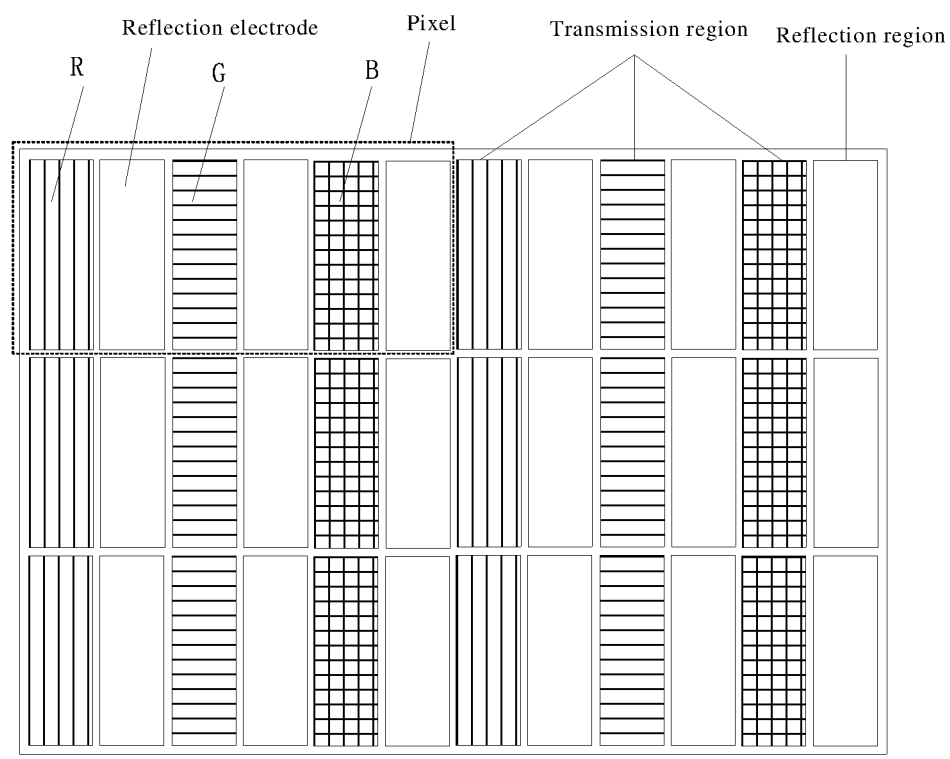
FIG. 2 is a schematic diagram of a sub-pixel in FIG. 1.

According to an embodiment of the present disclosure, the first substrate 11 may be an array substrate and the second substrate 12 may be a color filter substrate. FIG. 2 is a schematic diagram of a sub-pixel in FIG. 1.

As illustrated in FIG. 2, a plurality of pixels are provide on the transflective display panel, each of which may include transmission sub-pixels (such as sub-pixels illustrated as R, G and B) and reflection sub-pixels (such as illustrated as sub-pixels formed with reflecting electrodes) disposed alternatively. Regions formed with reflecting electrodes are reflection regions of the transflective display panel and regions not formed with reflecting electrodes are transmission regions of the transflective display panel. Transmission sub-pixels may include red sub-pixels R, green sub-pixels G or blue sub-pixels B.

In the example as illustrated in FIG. 2, each pixel includes a red sub-pixel R, a reflection sub-pixel, a green sub-pixel G, a reflection sub-pixel, a blue sub-pixel B and a reflection sub-pixel arranged in order laterally. It is possible to form transmission sub-pixels of corresponding colors by disposing color filters (not illustrated) on the second base substrate 121. It should be appreciated that the colors of transmission sub-pixels and the arrangement of transmission sub-pixels and reflection sub-pixels may be varied in various ways, which is not limited in the present application.

Figure 3:
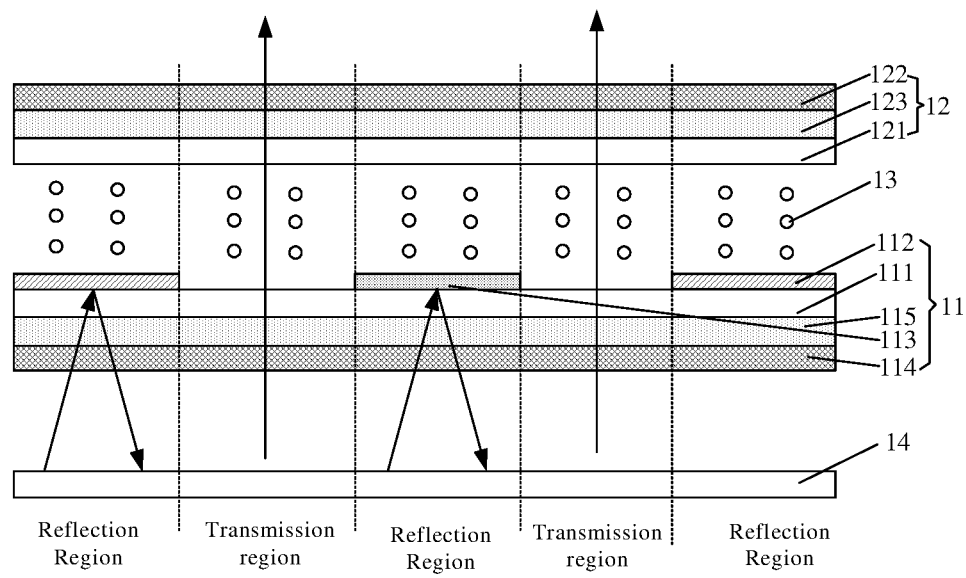
FIG. 3 is a schematic diagram of a transmission mode of the transflective display panel in FIG. 1.

The transflective display panel according to an embodiment of the present disclosure may be provided with a transmission mode and a reflection mode. FIG. 3 is a schematic diagram of a transmission mode of the transflective display panel in FIG. 1, and FIG. 4 is a schematic diagram of a reflection mode of the transflective display panel in FIG. 1.

As illustrated in FIG. 3, in the transmission mode, the back light emitted by the backlight module 14 can transmit through the transmission regions to realize color display. The back light emitted by the backlight module 14 can not transmit through reflection regions formed with reflecting electrodes upon arrival at them, but is reflected back to the backlight module 14. In this embodiment, reflecting electrodes may include pixel electrodes 112 and common electrodes 113.

Figure 4:
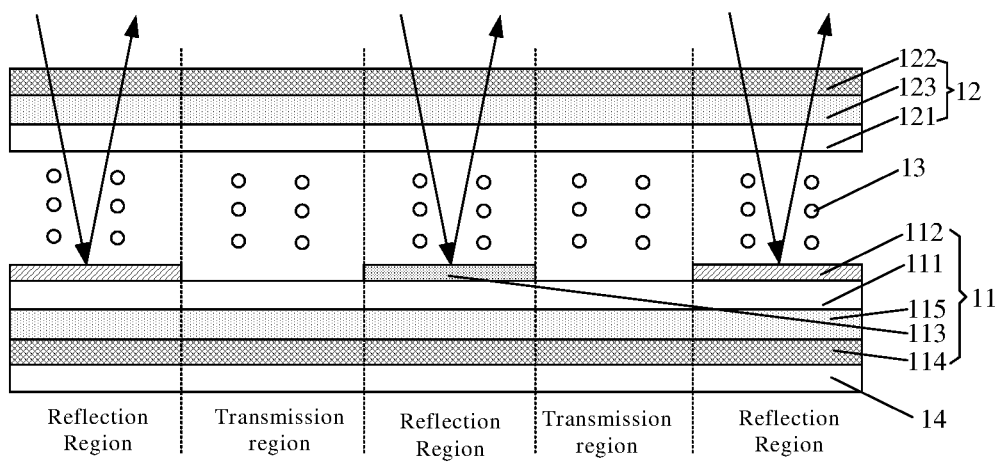
FIG. 4 is a schematic diagram of a reflection mode of the transflective display panel in FIG. 1.

As illustrated in FIG. 4, in the reflection mode, the backlight module 14 is turned off, and light for illumination is external ambient light. Ambient light is illuminated onto the reflecting electrodes in reflection regions and then reflected. In the reflection mode, it is possible not to turn on the backlight module 14 but use ambient light illumination to realize display function of the display panel, thereby achieving the purpose of saving electric energy. The transflective display panel according to an embodiment of the present disclosure can adopt the reflection mode in bright circumstance and adopt the transmission mode in dark circumstance.

In the present embodiment, pixel electrodes 112 and common electrodes 113 are disposed alternatively on the first base substrate 111. The transflective display panel according to the present embodiment is an in-plane switching (IPS) display panel. Here, both pixel electrodes 112 and common electrodes 113 are on the first base substrate 11 and disposed in the same layer.

Figure 5:
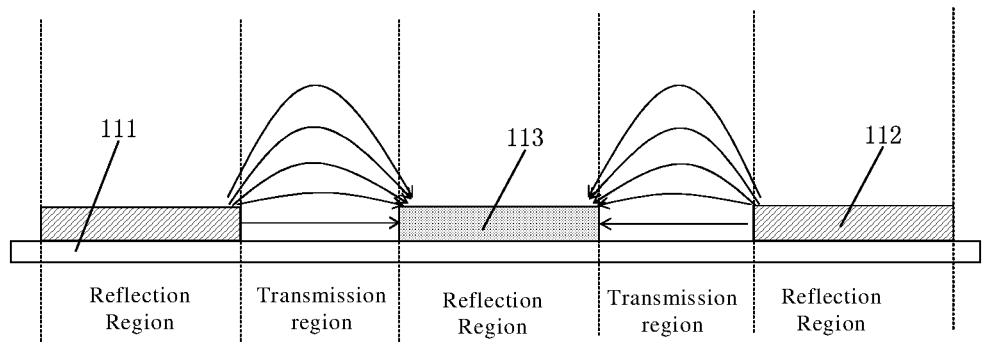
FIG. 5 is a schematic diagram of the strength of electric field of the transflective display panel in FIG. 1.

FIG. 5 is a schematic diagram of strength of electric field of the transflective display panel in FIG. 1.

Referring to FIGS. 1 and 5, for an IPS display panel, the strength of electric field between adjacent pixel electrode 112 and common electrode 113 is high, while the strength of electric field over pixel electrodes 112 and the strength of electric field over common electrodes 113 are both weak. Therefore, the strength of the electric field in reflection regions is smaller than that in the transmission regions. Because the strength of electric field in the reflection regions is smaller than that in the transmission regions, the transverse electric field strength in the reflection regions is smaller than that in the transmission regions. The back light passes the blue phase liquid crystal once while transmitting through transmission regions, and ambient light passes the blue phase liquid crystal twice while illuminated onto the reflection regions and then reflected. For a transflective display panel, it is generally required that the optical path differences in the reflection regions and the transmission regions are the same. Therefore, it is possible to control the optical path differences of the reflection regions and the transmission regions by controlling the strength of the transverse electric field in the reflection regions and the strength of the transverse electric field in the transmission regions such that the optical path differences in the reflection regions and the transmission regions are the same. Specifically, it is possible to have consistent optical path differences in the reflection regions and the transmission regions by making the strength of the transverse electric field in the reflection regions smaller than the strength of the transverse electric field in the transmission regions, such that it is not necessary to consider the cell thickness problem of the transflective display panel and the complexity of the manufacturing process is reduced.

According to an embodiment of the present disclosure, it is possible to provide bump structures (not illustrated in the drawings) under the reflecting electrodes to enhance the transverse electric field. Here the term "under" means the side of the reflecting electrodes facing away from the blue phase liquid crystal. In the present embodiment, since both pixel electrodes 112 and common electrodes 113 serve as reflecting electrodes, it is possible to provide bump structures under the pixel electrodes 112 and the common electrodes 113 to enhance the transverse electric field.

In the embodiment illustrated in FIG. 1, it is possible to provide a first quarter wave plate 115 and a first polarizer 114 in order on the first base substrate 111. The first quarter wave plate 115 and the first polarizer 114 may be disposed on a side of the first base substrate 111, which side is away from the second substrate 12. It is possible to dispose a second quarter wave plate 123 and a second polarizer 122 in order on the second base substrate 121. The second quarter wave plate 123 and the second polarizer 122 may be disposed on a side of the second base substrate 12, which side is away from the first substrate 11.

According to an embodiment of the present disclosure, the directions of the optical axes of the first quarter wave plate 115 and the second quarter wave plate 123 may be perpendicular to each other, the transmission axis direction of the first polarizer 114 and the transmission axis direction of the second polarizer 122 may be the same, the direction of optical axis of the first quarter wave plate 115 and the transmission axis direction of the first polarizer 114 may form an angle of 45 degree therebetween, and the direction of optical axis of the second quarter wave plate 123 and the transmission axis direction of the second polarizer 122 may form an angle of 45 degree therebetween. For example, with respect to the direction of the transverse electric field of the transflective display panel, the transmission axis direction of the first polarizer 114 may be at 45 degree, the optical axis direction of the first quarter wave plate 115 may be at 0 degree, the optical axis direction of the second quarter wave plate 123 may be at 90 degree, and the transmission axis direction of the second polarizer 122 may be at 45 degree.

Figure 6:
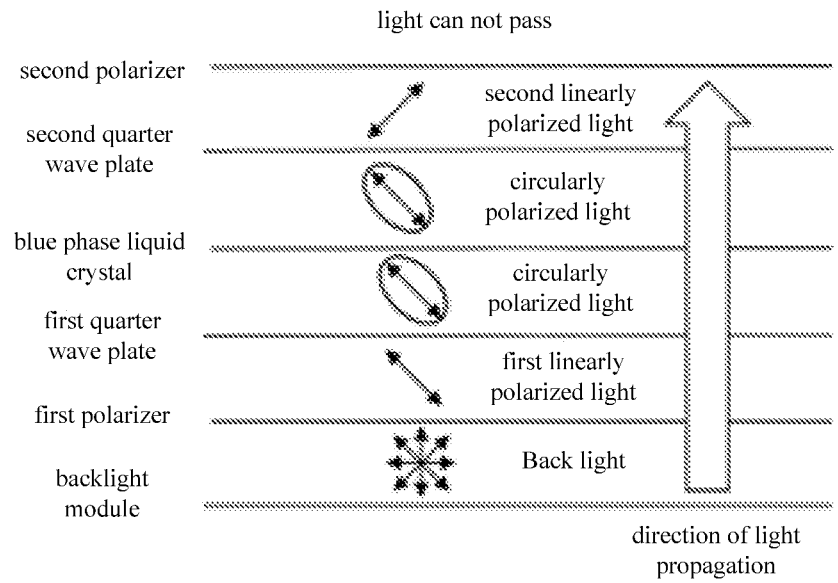
FIG. 6 is a schematic diagram of light variation in transmission regions while the transflective display panel in FIG. 1 is performing black state display.

The operating principle of the transflective display panel will be described below with respect to the light variation process while the transflective display panel is performing black state display (i.e., displaying black) as an example. FIG. 6 is a schematic diagram showing the light variation in the transmission regions while the transflective display panel in FIG. 1 is performing black state display, and FIG. 7 is a schematic diagram of light variation in reflection regions while the transflective display panel in FIG. 1 is performing black state display.

Referring to FIGS. 1 and 6, in the transmission regions, the back light becomes first linearly polarized light after passing through the first polarizer 114, which has a polarization direction the same as the transmission axis direction of the first polarizer 114. The first linearly polarized light becomes circularly polarized light after passing through the first quarter wave plate 115. Because the blue phase liquid crystal 13 exhibits isotropy in macroscopy scale without applying any driving voltage, the circularly polarized light will not change its original polarization characteristic after passing through the blue phase liquid crystal 13, and hence still circularly polarized light. The circularly polarized light becomes second linearly polarized light after passing through the second quarter wave plate 123 which has a polarization direction perpendicular to the transmission axis direction of the second polarizer 122 and therefore can not transmit through the second polarizer 122, and can not exit from the transflective display panel, thereby realizing black state display without applying any driving voltage.

Figure 7:
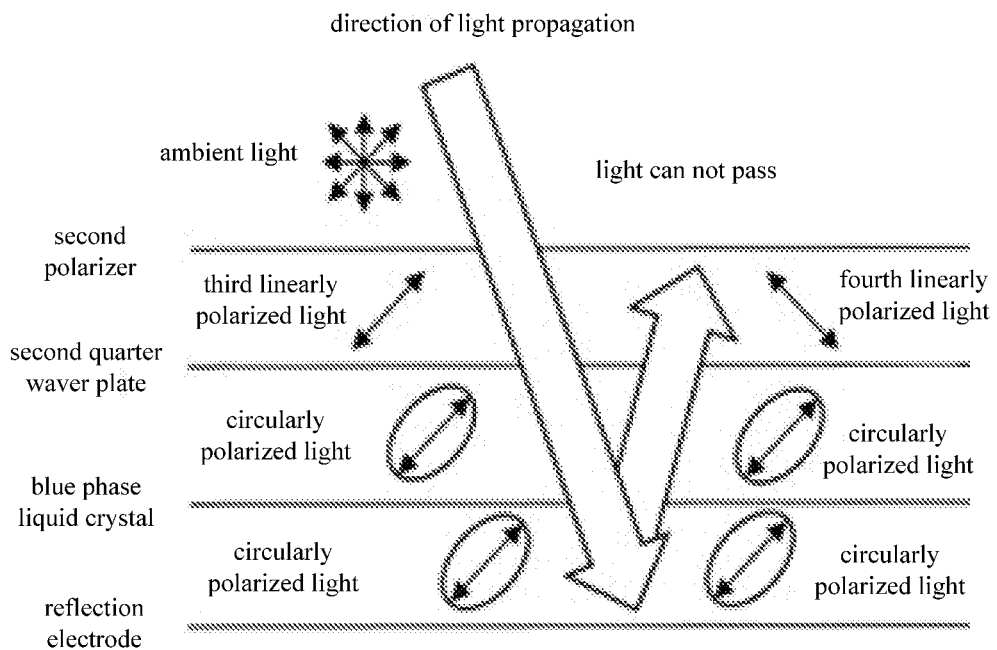
FIG. 7 is a schematic diagram of light variation in reflection regions while the transflective display panel in FIG. 1 is performing black state display.

Referring to FIGS. 1 and 7, in the reflection regions, the ambient light becomes third linearly polarized light after passing through the second polarizer 122 which has a polarization direction the same as the transmission axis direction of the second polarizer 122. The third linearly polarized light becomes circularly polarized light after passing through the second quarter wave plate 123. Because the blue phase liquid crystal 13 exhibits isotropy in macroscopy scale without applying any driving voltage, the circularly polarized light will not change its original polarization characteristic after passing through the blue phase liquid crystal 13, and hence still circularly polarized light. The circularly polarized light is still circularly polarized light after being reflected by the reflecting electrodes and passing through again the blue phase liquid crystal 13. The circularly polarized light becomes fourth linearly polarized light after passing through the second quarter wave plate 123 which has a polarization direction perpendicular to the transmission axis direction of the second polarizer 122 and therefore can not transmit through the second polarizer 122, and can not exit from the transflective display panel, thereby realizing black state display without applying any driving voltage.

The transflective display panel according to the present embodiment needs not to be provided with an alignment film, thereby reducing the complexity of the structure and the manufacturing process. In the present embodiment, blue phase liquid crystal is used and both pixel electrodes and common electrodes are located on a side of the first base substrate, which side faces the second substrate, thereby improving optical efficiency of the transflective display panel.

Figure 8:
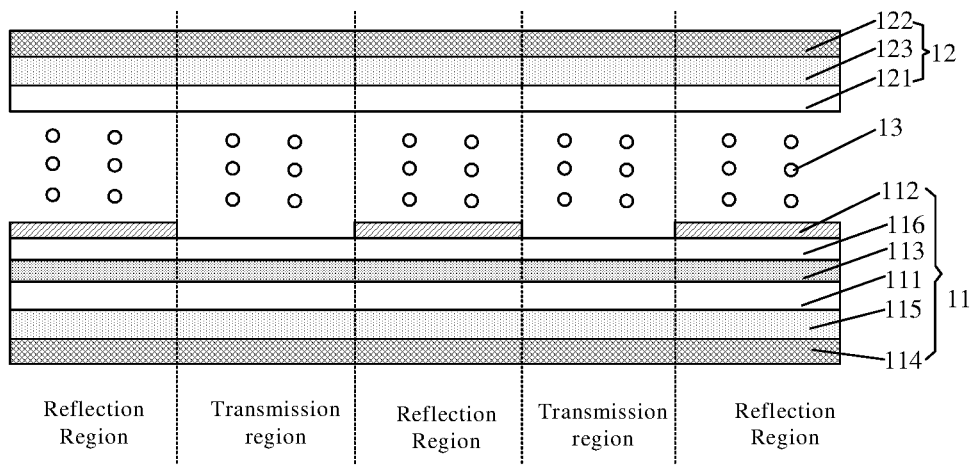
FIG. 8 is a structure diagram of a transflective display panel according to another embodiment of the present disclosure.
Figure 9:
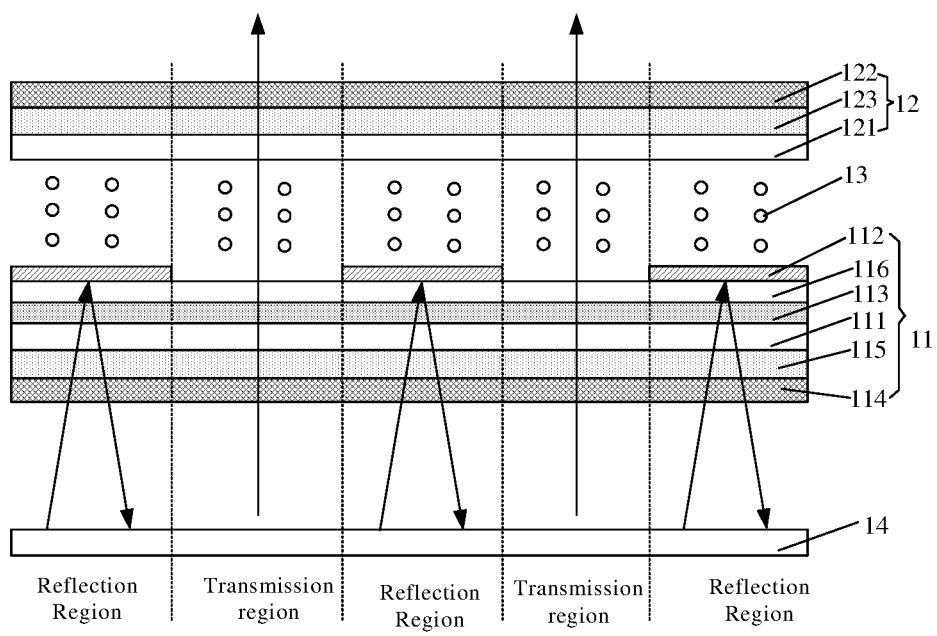
FIG. 9 is a schematic diagram of a transmission mode of the transflective display panel in FIG. 8.
Figure 10:
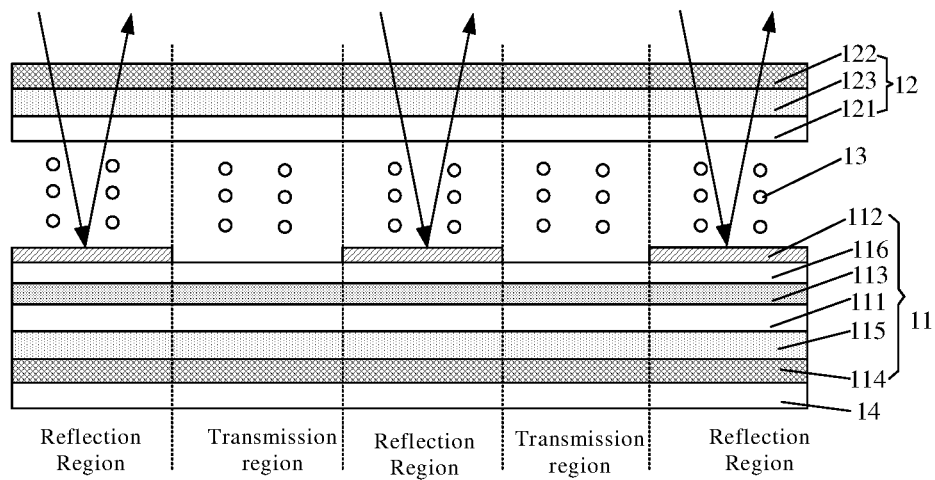
FIG. 10 is a schematic diagram of a reflection mode of the transflective display panel in FIG. 8.
Figure 11:
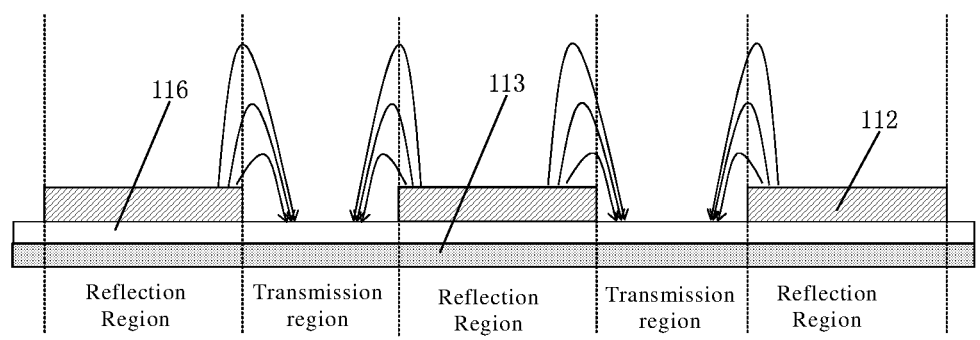
FIG. 11 is a schematic diagram of the strength of electric field of the transflective display panel in FIG. 8.

FIG. 8 is a structure diagram of a transflective display panel according to another embodiment of the present disclosure, FIG. 9 is a schematic diagram of a transmission mode of the transflective display panel in FIG. 8, FIG. 10 is a schematic diagram of a reflection mode of the transflective display panel in FIG. 8, and FIG. 11 is a schematic diagram of the strength of electric field of the transflective display panel in FIG. 8.

As illustrated in FIG. 8, the present embodiment is different from the above-mentioned embodiments described with reference to FIGS. 1-7 in that the first substrate 11 may further include an insulating layer 116. The common electrodes 113 are disposed between the first base substrate 111 and the insulating layer 116, and the insulating layer 116 is disposed between the common electrodes 113 and the pixel electrodes 112. Hereinbelow, differences from the above-mentioned embodiments will be described in detail and description of the same parts will be omitted.

As illustrated in FIG. 9, in the transmission mode, the back light emitted by the backlight module 14 can transmit through the transmission regions to realize color display. The back light emitted by the backlight module 14 can not transmit through the reflection regions formed with reflecting electrodes upon arrival at them, but is reflected back to the backlight module 14. In the present embodiment, reflecting electrodes include only pixel electrodes 112.

As illustrated in FIG. 10, in the reflection mode, the backlight module 14 is turned off, and light for illumination are external ambient light. Ambient light is illuminated onto the reflecting electrodes in the reflection regions and reflected. Reflecting electrodes include only pixel electrodes 112.

In the present embodiment, pixel electrodes 112 are disposed over common electrodes 113, and an insulating layer 116 is disposed between the pixel electrodes 112 and the common electrodes 113. The transflective display panel according to the present embodiment is an advanced super dimension switch (ADS) display panel.

Referring to FIGS. 8 and 11, for an ADS display panel, the strength of the electric field between the pixel electrodes 112 and the common electrodes 113 is high, while the strength of the electric field over the pixel electrodes 112 is weak. Therefore, the strength of the electric field in the reflection regions is smaller than that in the transmission regions. Because the strength of the electric field in the reflection regions is smaller than that in the transmission regions, the strength of the transverse electric field in the reflection regions is smaller than the strength of the transverse electric field in the transmission regions. Therefore, it is possible to have the same optical path differences in the reflection regions and the transmission regions by making the strength of the transverse electric field in the reflection regions smaller than the strength of the transverse electric field in the transmission regions, such that it is not necessary to consider the cell thickness problem of the transflective display panel and the complexity of manufacturing process is reduced.

Similar to the above-mentioned embodiments, bump structures (not illustrated in the drawings) may be provided on a side of the reflecting electrodes, which side is away from the blue phase liquid crystal for the purpose of enhancing transverse electric field. In the present embodiment, because only pixel electrodes 112 serve as reflecting electrodes, it is possible to provide bump structures on a side of pixel electrodes 112, which side is away from the blue phase liquid crystal to enhance the transverse electric field.

The transflective display panel according to embodiments of the present disclosure may be applied to a transflective display device that further includes a backlight module located on a side of the first substrate, which side is away from the second substrate. The backlight module may be an LED light source.

It is to be understood that the above implementations are only illustrative implementations for describing the principle of the present disclosure, and the present disclosure is not limited thereto. For those of ordinary skill in the art, various variations and improvements may be made without departing from the spirit and scope of the present disclosure, which are also considered to be in the scope of the present disclosure.

The application claims priority to the Chinese patent application No. 201510609220.9, filed Sep. 22, 2015, the entire disclosure of which is incorporated herein by reference as part of the present application.

What is claimed is:

1. A transflective display panel comprising: a first substrate and a second substrate disposed opposite to each other; and blue phase liquid crystal disposed between the first substrate and the second substrate,
wherein the first substrate comprises a first base substrate and pixel electrodes and common electrodes that are disposed on a side of the first base substrate that faces the second substrate, the pixel electrodes serve as reflecting electrodes or both the pixel electrodes and the common electrodes serve as reflecting electrodes,
wherein the second substrate comprises a second base substrate,
wherein a first quarter wave plate and a first polarizer are disposed in order on a side of the first base substrate that is away from the second substrate,
wherein a second quarter wave plate and a second polarizer are disposed in order on a side of the second base substrate that is away from the first substrate, and
wherein a direction of a transmission axis of the first polarizer is same as a direction of a transmission axis of the second polarizer.

2. The transflective display panel of claim 1, wherein a direction of an optical axis of the first quarter wave plate and a direction of an optical axis of the second quarter wave plate are perpendicular to each other.

3. The transflective display panel of claim 1, wherein a direction of an optical axis of the first quarter wave plate forms an angle of 45 degree with a direction of a transmission axis of the first polarizer.

4. The transflective display panel of claim 1, wherein a direction of an optical axis of the second quarter wave plate forms an angle of 45 degree with a direction of a transmission axis of the second polarizer.

5. The transflective display panel of claim 1, wherein both the pixel electrodes and the common electrodes serve as reflecting electrodes, and the pixel electrodes and the common electrodes are disposed alternatively on a side of the first base substrate that faces the second substrate.

6. The transflective display panel of claim 1, wherein the pixel electrodes serve as reflecting electrodes, and the first substrate further comprises an insulating layer, the common electrodes are disposed between the first base substrate and the insulating layer, and the insulating layer is disposed between the common electrodes and the pixel electrodes.

7. The transflective display panel of claim 1, wherein bump structures are disposed on a side of the reflecting electrode that is away from the blue phase liquid crystal.

8. The transflective display panel of claim 1, wherein a strength of a transverse electric field in reflection regions formed with the reflecting electrodes of the transflective display panel is smaller than that in transmission regions not formed with the reflecting electrodes of the transflective display panel.

9. A transflective display device, comprising the transflective display panel of claim 1 and a backlight module located on a side of the first substrate that is away from the second substrate.

10. The transflective display device of claim 9, wherein a first quarter wave plate and a first polarizer are disposed in order on a side of the first base substrate that is away from the second substrate, and
a second quarter wave plate and a second polarizer are disposed in order on a side of the second base substrate that is away from the first substrate.

11. The transflective display device of claim 10, wherein a direction of an optical axis of the first quarter wave plate and a direction of an optical axis of the second quarter wave plate are perpendicular to each other.

12. The transflective display device of claim 10, wherein a direction of a transmission axis of the first polarizer is the same as a direction of a transmission axis of the second polarizer.

13. The transflective display device of claim 10, wherein a direction of an optical axis of the first quarter wave plate forms an angle of 45 degree with a direction of a transmission axis of the first polarizer.

14. The transflective display device of claim 10, wherein a direction of an optical axis of the second quarter wave plate forms an angle of 45 degree with a direction of a transmission axis of the second polarizer.

15. The transflective display device of claim 9, wherein both the pixel electrodes and the common electrodes serve as reflecting electrodes, and the pixel electrodes and the common electrodes are disposed alternatively on a side of the first base substrate that faces the second substrate.

16. The transflective display device of claim 9, wherein the pixel electrodes serve as reflecting electrodes, and the first substrate further comprises an insulating layer, the common electrodes are disposed between the first base substrate and the insulating layer, and the insulating layer is disposed between the common electrodes and the pixel electrodes.

17. The transflective display device of claim 9, wherein bump structures are disposed on a side of the reflecting electrode that is away from the blue phase liquid crystal.

18. The transflective display device of claim 9, wherein a strength of a transverse electric field in reflection regions formed with the reflecting electrodes of the transflective display panel is smaller than that in transmission regions not formed with the reflecting electrodes of the transflective display panel.

* * * * *